United States Patent
Liu et al.

(10) Patent No.: US 12,282,561 B2
(45) Date of Patent: Apr. 22, 2025

(54) METHOD FOR ACCELERATING DEEP SLEEP STARTUP SPEED IN IOT

(71) Applicant: Beken Corporation, Shanghai (CN)

(72) Inventors: Zhifu Liu, Shanghai (CN); Zhilei Wang, Shanghai (CN); Pujie Yang, Shanghai (CN); Pengcheng Liu, Shanghai (CN)

(73) Assignee: Beken Corporation, Shanghai (CN)

( * ) Notice: Subject to any disclaimer, the term of this patent is extended or adjusted under 35 U.S.C. 154(b) by 107 days.

(21) Appl. No.: 18/448,361

(22) Filed: Aug. 11, 2023

(65) Prior Publication Data
US 2025/0036770 A1    Jan. 30, 2025

(30) Foreign Application Priority Data

Jul. 26, 2023    (CN) .......................... 202310931097.7

(51) Int. Cl.
| | |
|---|---|
| G06F 15/177 | (2006.01) |
| G06F 9/00 | (2018.01) |
| G06F 9/4401 | (2018.01) |
| G06F 21/57 | (2013.01) |
| H04L 9/32 | (2006.01) |

(52) U.S. Cl.
CPC .......... *G06F 21/575* (2013.01); *G06F 9/4418* (2013.01); *H04L 9/32* (2013.01); *G06F 2221/034* (2013.01)

(58) Field of Classification Search
CPC ................. G06F 21/575; G06F 9/4418; G06F 2221/034; H04L 9/32
See application file for complete search history.

(56) References Cited

U.S. PATENT DOCUMENTS

| | | | |
|---|---|---|---|
| 11,783,043 B2* | 10/2023 | Perez ..................... | G06F 21/575 |
| | | | 713/2 |
| 2017/0177870 A1* | 6/2017 | Hildebrand ........... | G06F 21/575 |
| 2019/0042765 A1* | 2/2019 | Chung .................. | G06F 21/575 |
| 2021/0182435 A1* | 6/2021 | Hunacek ................ | G06F 21/72 |
| 2022/0284088 A1* | 9/2022 | Peng ....................... | G06F 21/44 |
| 2024/0143772 A1* | 5/2024 | Farrell .................. | G06F 9/4401 |

* cited by examiner

*Primary Examiner* — Xuxing Chen
(74) *Attorney, Agent, or Firm* — Schwegman Lundberg & Woessner, P.A.

(57) ABSTRACT

A method for accelerating sleep startup speed is provided. The method may include determining that a system-on-chip (SoC) is under a sleep mode; determining that a wake-up condition is met; calculating a second authentication key based on data stored in a flash memory of the SoC using a cryptographic algorithm; comparing the second authentication key with a first authentication key, wherein the first authentication key is associated with a secure boot of the SoC and obtained from an Always On (AON) memory of the SoC; and in response to a comparison result that the first authentication key is the same as the second authentication key, waking the SoC up from the sleep mode.

20 Claims, 4 Drawing Sheets

METHOD FOR ACCELERATING DEEP SLEEP STARTUP SPEED IN IOT

CROSS REFERENCE TO RELATED APPLICATION

This application claims priority to and incorporates by reference Chinese patent application no. 202310931097.7 filed 26 Jul. 2023.

TECHNICAL FIELD

The present disclosure generally relates to startup of electronic devices. In particular, example embodiments of the present disclosure address systems and methods for accelerating sleep startup speed in Internet of Things (IoT) devices.

BACKGROUND

The IoT is a network of physical objects (referred to as "smart devices" or "IoT devices") that are embedded with sensors, software, and other technologies for enabling connection and exchange of data with other devices via the Internet. For example, the IoT devices are used in home automation to control lighting, heating and air conditioning, media and security systems, and camera systems. A number of IoT devices have been provided that function as smart home hubs to connect different smart home products. IoT devices have been used in a number of other applications as well. Application layer protocols and supporting frameworks have been provided for implementing such IoT applications.

The secure boot of IoT devices is an important process realized by software programs permanently written in a Read-only Memory (ROM). It uses a public key stored in a one-time programmable (OTP) memory to verify one or more programs to be executed. If the verification is successful, programs at subsequent levels are loaded and verified, and the process repeats. In this way, a chain of trust is formed, and the secure boot is the foundation and source of the chain of trust.

Over the last few years, power consumption has become a significant focus in the IoT industry. Sleep mode is a power-saving mode in that all modules (including the CPU) of the IoT devices, except an Always-On (AON) module, are turned off. Because most modules are not working, attacks in sleep mode cannot be detected by the IoT devices. The undetected attacks can modify, replace, or damage data in the memory and cause serious harm to the IoT devices.

SUMMARY

A method for accelerating sleep startup speed is provided. The method includes determining that a system-on-chip (SoC) is under a sleep mode; determining that a wake-up condition is met; calculating a second authentication key based on data stored in a flash memory of the SoC using a cryptographic algorithm; comparing the second authentication key with a first authentication key, wherein the first authentication key is associated with a secure boot of the SoC and obtained from an Always On (AON) memory of the SoC; and in response to a comparison result that the first authentication key is the same as the second authentication key, waking the SoC up from the sleep mode.

A system-on-chip (SoC) is provided. The SoC includes a processor configured to: determine that the SoC is under a sleep mode; determine that a wake-up condition is met; calculate a second authentication key based on data stored in a flash memory of the SoC using a cryptographic algorithm; compare the second authentication key with a first authentication key, wherein the first authentication key is associated with a secure boot of the SoC and obtained from an Always On (AON) memory of the SoC; and in response to a comparison result that the first authentication key is the same as the second authentication key, wake the SoC up from the sleep mode.

A non-transitory computer-readable storage medium is provided. The computer-readable storage medium including instructions that when executed by a computer, cause the computer to: determine that a system-on-chip (SoC) is under a sleep mode; determine that a wake-up condition is met; calculate a second authentication key based on data stored in a flash memory of the SoC using a cryptographic algorithm; compare the second authentication key with a first authentication key, wherein the first authentication key is associated with a secure boot of the SoC and obtained from an Always On (AON) memory of the SoC; and in response to a comparison result that the first authentication key is the same as the second authentication key, wake the SoC up from the sleep mode.

BRIEF DESCRIPTION OF THE DRAWINGS

To easily identify the discussion of any particular element or act, the most significant digit or digits in a reference number refer to the figure number in which that element or act is first introduced.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As mentioned above, the attacks in sleep mode cannot be detected by the IoT devices when they start up (or are awakened) from the sleep mode. A direct startup is unsafe and performing a whole secure boot process is time and energy-consuming.

The present disclosure provides systems and methods to start up an IoT device from a sleep mode both safely and at a fast speed. First, the IoT device is booted under a complete secure boot process. After the secure boot process is finished, a first hash value (or first authentication key) is calculated, based on data in the flash memory (e.g., public key, hash value of image, patch, and image) and is stored in an AON memory. When the IoT device enters the sleep mode, the data in the flash memory may be modified, replaced, or damaged by the attacks, while the first hash value stored in the AON memory remains the same. When the IoT device is woken or starts up from the sleep mode, a second hash value (or second authentication key) is calculated based on the current data in the flash memory. Then the first hash value is compared with the second hash value. If the first hash value and the second hash value are the same, the IoT device proceeds with the startup. If the first hash value and the second hash value are different, the IoT device is held in the sleep mode and generates a notification that it was attacked in the sleep mode.

Therefore, the present disclosure potentially has at least the following advantages:

1. The startup speed from sleep mode is faster than performing a complete secure boot process.
2. Attacks in the sleep mode can be detected.

Figure 1:
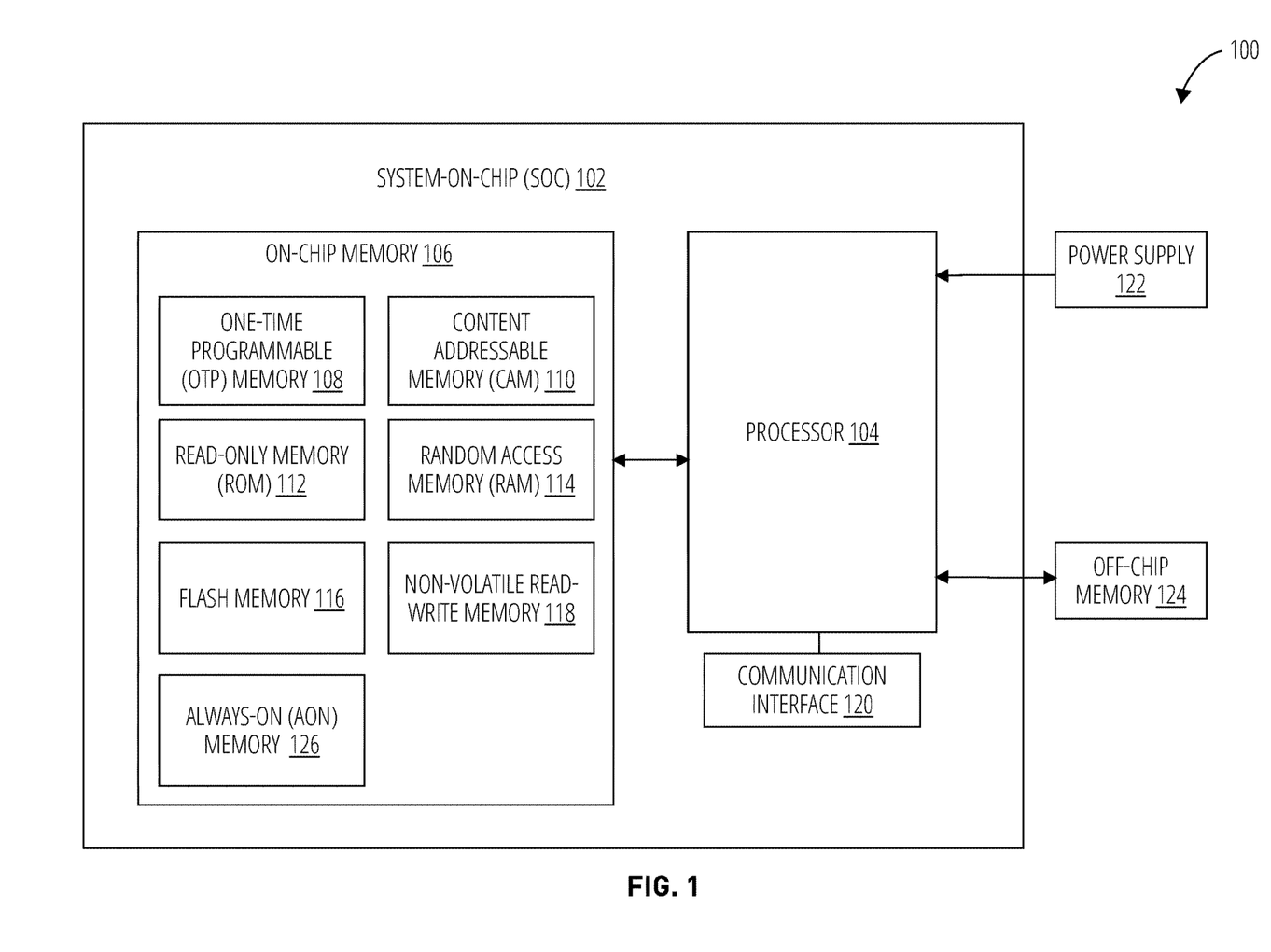
FIG. 1 is a block diagram illustrating an internet of things (IoT) device, in accordance with some example embodiments.

FIG. 1 is a block diagram illustrating an internet of things (IoT) device 100, in accordance with some example embodiments. The IoT device 100 may include a system-on-chip (SoC) 102, a power supply 122, and an off-chip memory 124. The SoC 102 may include a processor 104, on-chip memories 106, and a communication interface 120. The on-chip memories 106 may include a one-time programmable (OTP) memory 108, a content addressable memory (CAM) 110, a read-only memory (ROM) 112, a random-access memory (RAM) 114, a flash memory 116 and/or a non-volatile read-write memory (NVM) 118.

The processor 104 may perform arithmetical, logical, input/output (I/O), and other basic instructions. The processor 104 may make determinations, receive data from, and/or send data/instructions to other components of the IoT device 100.

The OTP memory 108 may be a non-volatile memory that permits data to be written only once. Once the memory has been programmed, it retains its value upon losing power. OTP memory 108 may be used in applications where reliable and repeatable reading of data is required. Examples include boot code, encryption keys, and configuration parameters for analog, sensor, or display circuitry. In some embodiments, the OTP memory 108 may be replaced by an electronic fuse (eFuse) or a physical unclonable function (PUF).

The CAM 110 may be a data storage device that stores memory in cells. When any aspect of the memory is entered, the CAM 110 may compare the input with all the stored data. In the CAM 110, memories are not arranged in chronological order and are not packed in isolated modules.

The ROM 112 is a type of electronic storage built into the IoT device 100 during manufacturing. The ROM 112 may store "firmware," which is permanent software that's hard-wired with integrated circuits. The manufacturer may fit a specifically designed ROM chip into a device during the building process. Unlike the non-volatile memory of a hard drive, it's difficult and time-consuming to rewrite the ROM 112.

The RAM 114 is a form of memory that can be read and changed in any order, typically used to store working data and machine code. The RAM 114 may allow data items to be read or written in almost the same amount of time irrespective of the physical location of data inside the memory, in contrast with other direct-access data storage media, where the time required to read and write data items varies significantly depending on their physical locations on the recording medium, due to mechanical limitations such as media rotation speeds and arm movement.

The flash memory 116 is a long-life and non-volatile storage chip widely used in embedded systems. The flash memory 116 can keep stored data and information even when the power is off. The flash memory 116 can be electrically erased and reprogrammed. Because the flash memory 116 can be easily modified (in other words, attacked), the flash memory 116 may include additional data for security purposes, such as a public key, an image hash value, a manifest signature, etc.

The NVM 118 is a type of computer memory that has the capability to hold saved data even if the power is turned off. Unlike volatile memory, NVM 118 does not require its memory data to be periodically refreshed. As mentioned above, the ROM 112 is a type of NVM, and the OTP memory 108, after programming once, also becomes a type of NVM. The NVM 118 herein may refer to other non-volatile memories. In some embodiments, the NVM 118 may be omitted.

The communication interface 120 may facilitate communication between the IoT device 100 or a component thereof with an external device. The communication may be wired or wireless.

The power supply 122 may be an electrical device that supplies electric power to the SoC 102. In some embodiments, whenever the power supply 122 is turned on, the SoC 102 may perform a secure boot.

The off-chip memory 124 may be a memory that is not on the SoC 102. The off-chip memory 124 generally has more latency than on-chip memories 106, meaning less frequently used or less critical data may be stored in the off-chip memory 124. In some embodiments, the off-chip memory 124 may work as a substitute for one or more on-chip memories 106.

The on-chip memory 106 may further include an Always-On (AON) memory 126. The AON memory 126 is a type of non-volatile memory that retains its data even when power is lost. Unlike volatile memory, which loses its data when the power is turned off, AON memory 126 allows data to be stored permanently and requires no external power source to maintain the data. Details regarding the data stored in AON memory 126 may be found elsewhere in the present disclosure. See, e.g., FIG. 3 and descriptions thereof.

In some embodiments, the IoT device 100 may further include functional components based on desired functions of the IoT device 100. For example, the IoT device 100 may include a sensor, a speaker, a display, a light, a camera, a microphone, or the like, or any combination thereof.

It should be noted that although the present disclosure is described using the IoT device as an example, the present disclosure may be used in any other applicable systems or devices without departing from the spirit of the present disclosure. For example, the present method can be used by any device, including a SoC with a demand of accelerating sleep startup speed while also detecting attacks in the sleep mode. As another example, the present method can be used by a device to accelerate a startup speed from other power-saving modes.

Figure 2:
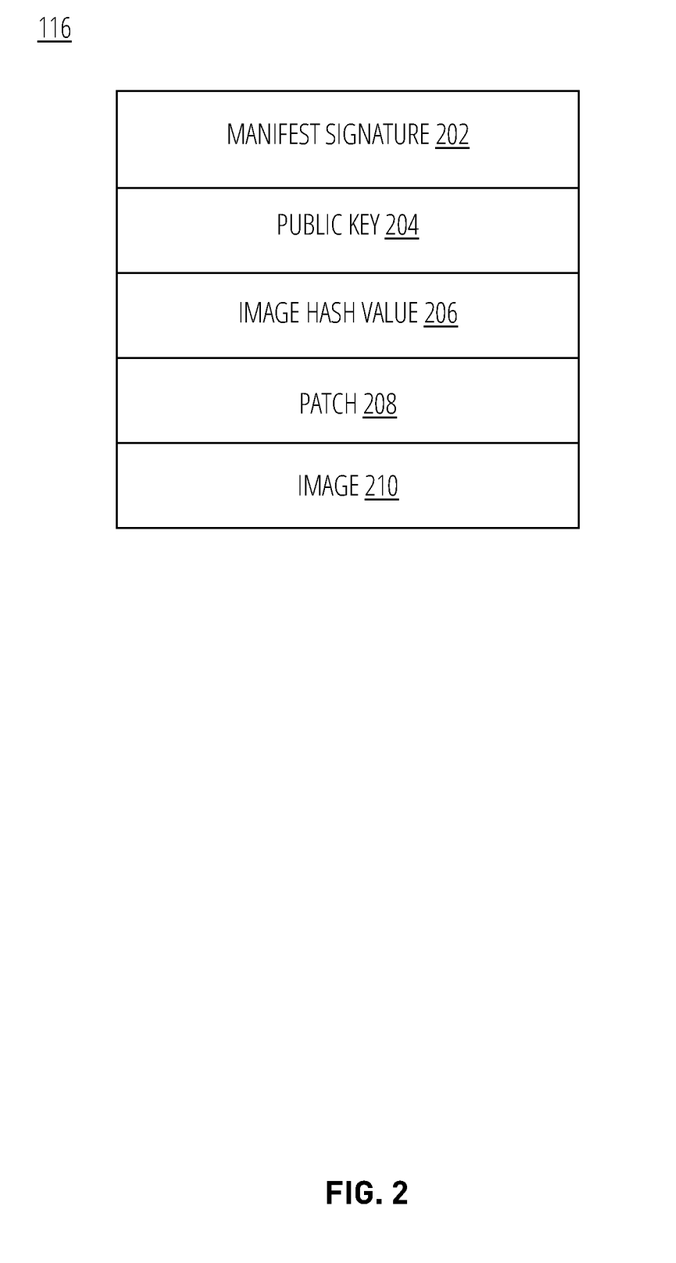
FIG. 2 is a schematic diagram illustrating data stored in a flash memory of the IoT device, in accordance with some example embodiments.

FIG. 2 is a schematic diagram illustrating data stored in a flash memory 116 of the IoT device 100, in accordance with some example embodiments. As shown in FIG. 2, the flash memory 116 may include a manifest signature 202, a public key 204, an image hash value 206, a patch 208, and/or an image 210.

The manifest signature (also referred to as digital signature) 202 may be a value calculated based on a manifest (signature data) and a private key. The manifest refers to the public key 204, the image hash value 206, and/or the patch 208, collectively. The private key may be paired with the public key 204. Any information encrypted by a private key may be decrypted to the original information using a public key or vice versa. The private key may be unknown to anyone except the designer or manufacturer.

The public key 204 may be a series of numbers created by a symmetric or asymmetric algorithm. The public key 204 may be generated with a paired private key based on the symmetric or asymmetric algorithm. For the symmetric algorithm, the generated public key 204 and the paired private key are the same. For the asymmetric algorithm, the generated public key 204 and the paired private key are different.

The IoT device 100 may generate a public key hash value using a cryptographic algorithm based on the public key 204. The public key hash value may be compared with a public key hash value pre-stored in the OTP memory 108 during the secure boot. The cryptographic algorithm may include a secure hash algorithm (SHA) and/or a message authentication code (MAC) algorithm, or other algorithm(s). The SHA algorithm may include an SHA-2 algorithm and/or an SHA-3 algorithm. The SHA-2 algorithm may include an SHA-224 algorithm, an SHA-256 algorithm, an SHA-384 algorithm, and/or an SHA-512 algorithm.

The image hash value 206 may be a value generated based on the image 210 using a cryptographic algorithm. Merely by way of example, the image hash value 206 is generated using the SHA-256 algorithm and is 256-bit long. It should be noted that the image 210 used herein may refer to a code image of executable programs rather than pictures. After the secure boot of the IoT device 100 is passed, the image 210 may be executed by the IoT device 100 to perform certain functions.

The patch 208 may include a code image of a patch that is desired to be applied to the IoT device 100. In some embodiments, the patch 208 may be designed to cure a problem or a defect in the IoT device 100 or to update part or all of the IoT device 100. For example, the patch 208 may change at least one hardware property of the SoC 102 (e.g., a clock frequency of the flash memory) of the IoT device 100. As another example, the patch 208 may change a software function related to the booting of the IoT device 100. The change of the software function may be realized by, for example, changing a function call table stored in the ROM 112.

Figure 3:
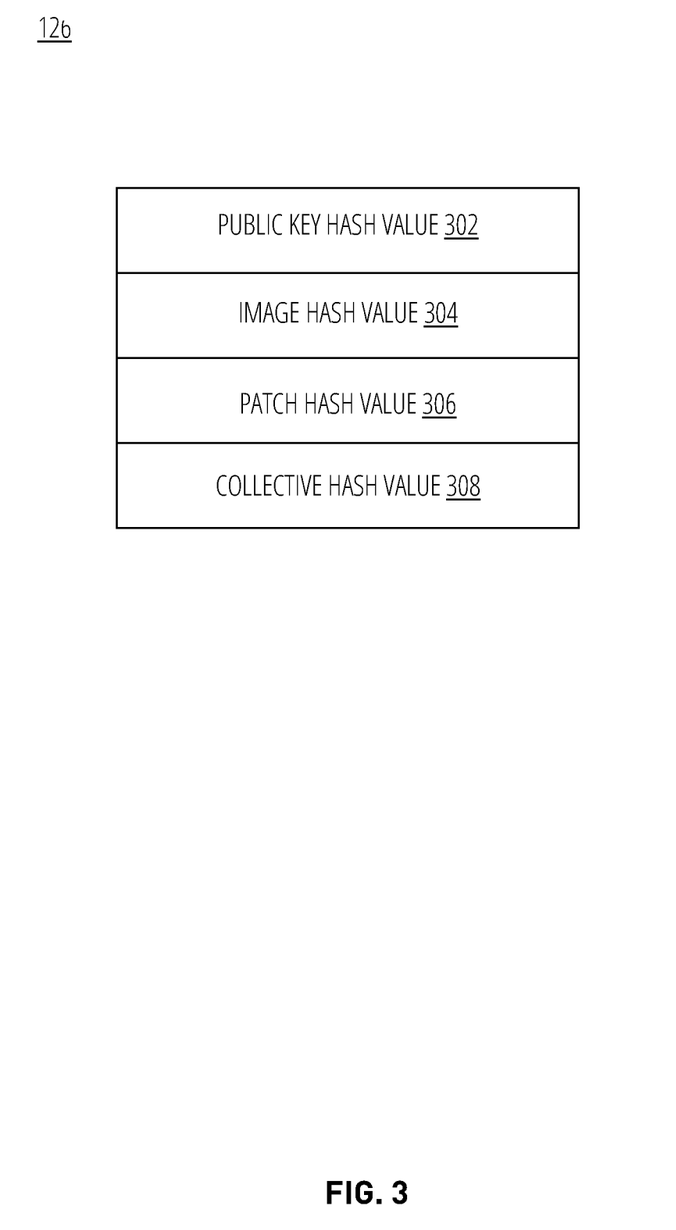
FIG. 3 is a schematic diagram illustrating data stored in an Always-On (AON) memory of the IoT device, in accordance with some example embodiments.

FIG. 3 is a schematic diagram illustrating data stored in the AON memory 126 of the IoT device 100, in accordance with some example embodiments. As shown in FIG. 3, the AON memory 126 may include a public key hash value 302, an image hash value 304, a patch hash value 306, and a collective hash value 308.

The public key hash value 302 may be a value calculated based on a public key using a cryptographic algorithm. In some embodiments, the public key hash value 302 is calculated based on the public key 204. Alternatively, the public key hash value 302 is obtained directly from the OTP memory 108. The public key hash value 302 may be calculated or obtained during the secure boot of the IoT device 100 or any time before the IoT device 100 enters the sleep mode.

The image hash value 304 may be a value calculated based on an image using a cryptographic algorithm. In some embodiments, the image hash value 304 is calculated based on the image 210. Alternatively, the image hash value 304 is a copy of the image hash value 206. The image hash value 304 may be calculated or obtained during the secure boot of the IoT device 100 or any time before the IoT device 100 enters the sleep mode.

The patch hash value 306 may be a value calculated based on a patch using a cryptographic algorithm. In some embodiments, the patch hash value 306 is calculated based on the patch 208. Alternatively, the patch hash value 306 is obtained directly from the OTP memory 108. The patch hash value 306 may be calculated or obtained during the secure boot of the IoT device 100 or any time before the IoT device 100 enters the sleep mode.

The collective hash value 308 may be a value calculated based on one or more sets of data collectively stored in the flash memory 116 (or the OTP memory 108) using a cryptographic algorithm. For example, the collective hash value 308 is generated based on manifest data (including public key 204, image hash value 206, patch 208) and image 210.

It should be noted the hash values 302-308 mentioned herein are merely examples and shall not be limiting. The idea of the present disclosure is to pre-store short, encrypted value(s) in an AON memory before the IoT device enters the sleep mode and calculate the value(s) again from the same source in the IoT device 100 after the IoT device is woken. The values are compared with each other to check whether the device is attacked during the sleep mode. Unlike the secure boot process which compares full-length public keys, the comparison of hash values is much faster (at least once and up to 10 times faster).

Figure 4:
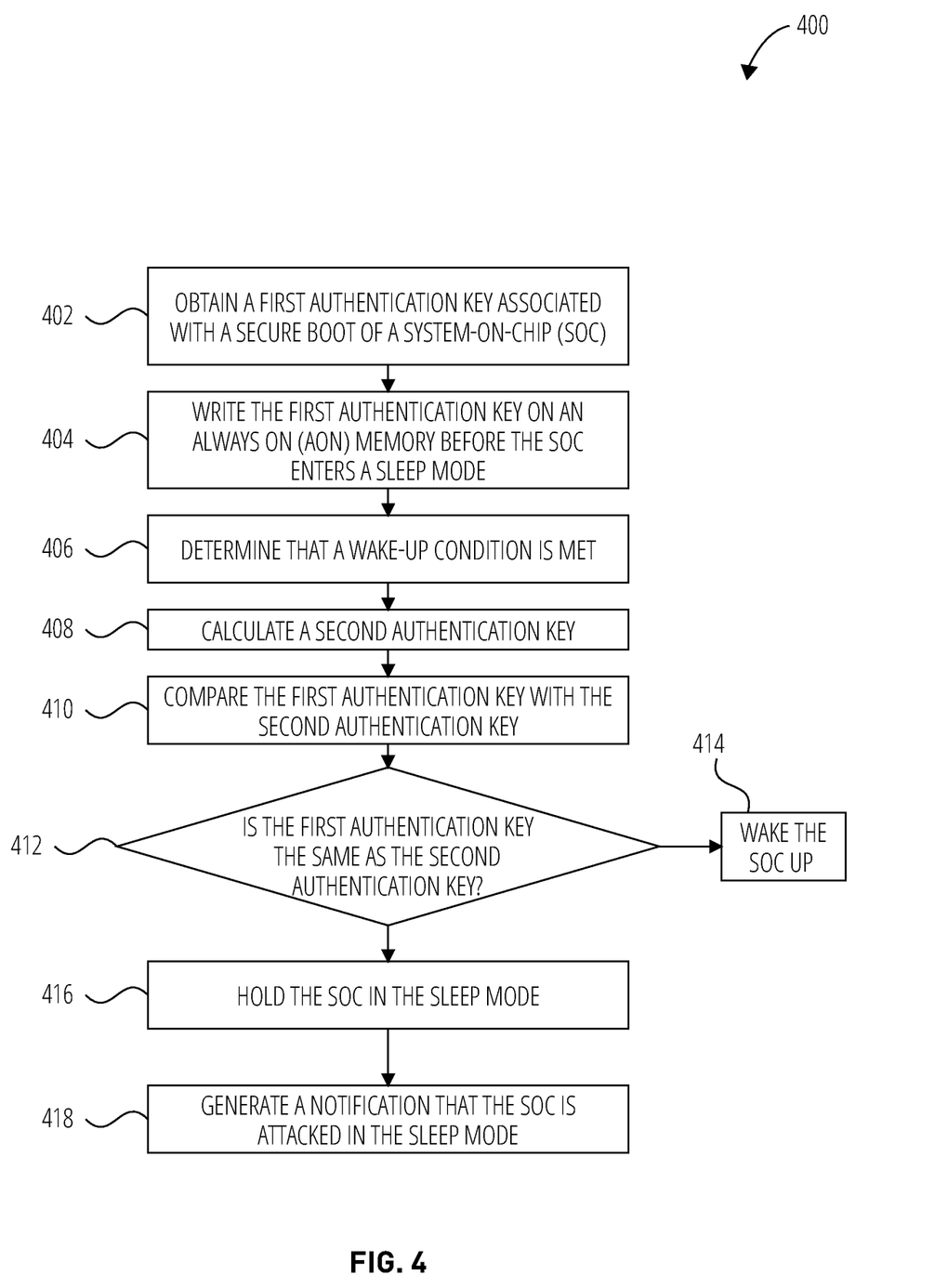
FIG. 4 is a flowchart illustrating operations of the IoT device in starting up the IoT device from a sleep mode, in accordance with some example embodiments.

FIG. 4 is a flowchart illustrating operations of the IoT device in starting up the IoT device from a sleep mode, in accordance with some example embodiments. The method 400 may be embodied in computer-readable instructions for execution by one or more processors such that operations of the method 400 may be performed in part or in whole by the functional components of the IoT device 100; accordingly, the method 400 is described below by way of example with reference thereto. However, it shall be appreciated that at least some of the operations of the method 400 may be deployed on various other hardware configurations than the IoT device 100. Also, the operations of the method 400 may be partially omitted, or performed in any order.

In operation 402, the IoT device 100 may obtain a first authentication key (or first hash value) associated with a secure boot of a system-on-chip (SoC). The first authentication key may be generated based on one or more sets of data stored in the flash memory 116 or the OTP memory 108 using a cryptographic algorithm. Examples of the first authentication key may include public key hash value 302, image hash value 304, patch hash value 306, collective hash value 308, etc. In some embodiments, the first authentication key may be generated during the secure boot of the IoT device 100. Alternatively, the first authentication key is generated after the secure boot of the IoT device 100 but before the IoT device enters a sleep mode. For example, the first authentication key is a collective hash value 308 generated based on the public key 204, the image hash value 206, the patch 208 and the image 210, collectively, using a SHA-256 algorithm.

In operation 404, the IoT device 100 may write the first authentication key on an AON memory before the SoC enters a sleep mode. The IoT device 100 may write part (e.g., first 32 bits) or all the bits of the calculated first authentication key on the AON memory. Then the IoT device 100 may enter a sleep mode, while all the modules in the IoT device 100 are turned off (except the AON memory).

In operation 406, the IoT device 100 may determine that a wake-up condition is met. The wake-up condition may include receiving a user interaction with the device, such as pressing a button or tapping the screen, reaching a preset wake-up time, passing a preset time duration, receiving an internal wake-up triggering signal, receiving an external wake-up instruction, sensing a movement or fall, sensing a change of light condition, sensing a change of sound condition, etc.

In operation 408, the IoT device 100 may calculate a second authentication key. In some embodiments, the second authentication key is calculated based on one or more sets of data stored in the same source used to generate the first authentication key, using a same cryptographic algorithm. For example, the second authentication key is a collective hash value generated based on the public key 204, the image hash value 206, the patch 208 and the image 210, collectively, using a SHA-256 algorithm.

In operation 410, the first authentication key and the second authentication key are compared. In some embodiments, all the bits of the first authentication key and the second authentication key are compared. Alternatively, only part (e.g., first 16 bits, first 32 bits) of the first authentication key and the second authentication key are compared.

In operation 412, the IoT device 100 may determine whether the first authentication key is the same as the second authentication key. In response to a determination that the first authentication key is the same as the second authentication key, the method 400 proceeds to 414 and wakes the SoC up (or the startup of the IoT device continues); otherwise, the method 400 proceeds to 416.

In operation 416, the IoT device 100 may hold the SoC in the sleep mode. The IoT device 100 may allow limited modules or components to be woken and perform limited work. For example, the communication interface 120 may be woken to receive or transmit signals. As another example, an onboard error indicator (e.g., an LED) is allowed to light up. Most modules and components are held in sleep mode to avoid further damage to the IoT device.

In operation 418, the IoT device 100 may generate a notification that the SoC is attacked in the sleep mode. In some embodiments, the notification may be generated to one or more components of the IoT device 100. Additionally, or alternatively, the notification may be generated to an external device (e.g., a user mobile device, a server) via, e.g., the communication interface 120.

Examples

1. A method comprising:
   determining that a system-on-chip (SoC) is under a sleep mode;
   determining that a wake-up condition is met;
   calculating a second authentication key based on data stored in a flash memory of the SoC using a cryptographic algorithm;
   comparing the second authentication key with a first authentication key, wherein the first authentication key is associated with a secure boot of the SoC and obtained from an Always On (AON) memory of the SoC; and
   in response to a comparison result that the first authentication key is the same as the second authentication key, waking the SoC up from the sleep mode.

2. The method of example 1, wherein the first authentication key is written on the AON memory before the SoC enters the sleep mode.
3. The method of any of the preceding examples, further comprising:
   in response to a comparison result that the first authentication key is different from the second authentication key, holding the SoC in the sleep mode.
4. The method of any of the preceding examples, wherein in response to the comparison result that the first authentication key is different from the second authentication key, the method further comprises:
   generating a notification that the SoC is attacked during the sleep mode.
5. The method of any of the preceding examples, wherein the second authentication key comprises:
   a signature key calculated based on signature data read from the flash memory.
6. The method of any of the preceding examples, wherein the second authentication key comprises:
   an image key calculated based on a code image read from the flash memory.
7. The method of any of the preceding examples, wherein the second authentication key does not include a public key.
8. The method of any of the preceding examples, wherein the comparing the first authentication key with the second authentication key comprises:
   comparing a part of the first authentication key with a corresponding part of the second authentication key.
9. The method of any of the preceding examples, wherein the comparing the first authentication key with second authentication key comprises:
   comparing first 32 bits of the first authentication key with first 32 bits of the second authentication key.
10. The method of any of the preceding examples, wherein the first authentication key is read from a one-time programmable (OTP) memory of the SoC during the secure boot of the SoC.
11. The method of any of the preceding examples, wherein the wake-up condition comprises:
    receiving a wake-up instruction signal from an external device;
    pasting a pre-determined time duration under the sleep mode; or
    receiving a wake-up triggering signal from an internal component of the SoC.
12. A system-on-chip (SoC) comprising:
    a processor configured to:
      determine that the SoC is under a sleep mode;
      determine that a wake-up condition is met;
      calculate a second authentication key based on data stored in a flash memory of the SoC using a cryptographic algorithm;
      compare the second authentication key with a first authentication key, wherein the first authentication key is associated with a secure boot of the SoC and obtained from an Always On (AON) memory of the SoC; and
      in response to a comparison result that the first authentication key is the same as the second authentication key, wake the SoC up from the sleep mode.
13. The SoC of example 12, wherein the first authentication key is written on the AON memory before the SoC enters the sleep mode.

14. The SoC of any of the preceding examples, wherein the processor is further configured to:
in response to a comparison result that the first authentication key is different from the second authentication key, hold the SoC in the sleep mode and generate a notification that the SoC is attacked during the sleep mode.
15. The SoC of any of the preceding examples, wherein the second authentication key comprises:
a signature key calculated based on signature data read from the flash memory.
16. The SoC of any of the preceding examples, wherein the second authentication key comprises:
an image key calculated based on a code image read from the flash memory.
17. The SoC of any of the preceding examples, wherein the comparing the first authentication key with the second authentication key comprises:
comparing a part of the first authentication key with a corresponding part of the second authentication key.
18. The SoC of any of the preceding examples, wherein the first authentication key is read from a one-time programmable (OTP) memory of the SoC during the secure boot of the SoC.
19. The SoC of any of the preceding examples, wherein the wake-up condition comprises:
receiving a wake-up instruction signal from an external device;
pasting a pre-determined time duration under the sleep mode; or
receiving a wake-up triggering signal from an internal component of the SoC.
20. A non-transitory computer-readable storage medium, the computer-readable storage medium including instructions that when executed by a computer, cause the computer to:
determine that a system-on-chip (SoC) is under a sleep mode;
determine that a wake-up condition is met;
calculate a second authentication key based on data stored in a flash memory of the SoC using a cryptographic algorithm;
compare the second authentication key with a first authentication key, wherein the first authentication key is associated with a secure boot of the SoC and obtained from an Always On (AON) memory of the SoC; and
in response to a comparison result that the first authentication key is the same as the second authentication key, wake the SoC up from the sleep mode.

CONCLUSION

The present disclosure provides systems and methods to start up an IoT device from a sleep mode both safely and at a fast speed. After a secure boot is finished, a first hash value (or first authentication key) is calculated based on data in the flash memory (e.g., public key, hash value of image, patch, and image) and stored in an AON memory. When the IoT device is woken or starts up from the sleep mode, a second hash value (or second authentication key) is calculated based on the current data in the flash memory. Then the first hash value is compared with the second hash value to determine whether to start up the IoT device or to hold it in the sleep mode. Therefore, the present disclosure potentially has at least the following advantages: 1. The startup speed from sleep mode is faster than performing a whole secure boot process. 2. Attacks in the sleep mode can be detected.

What is claimed is:
1. A method comprising:
determining that a system-on-chip (SoC) is under a sleep mode;
determining that a wake-up condition is met;
calculating a second authentication key based on data stored in a flash memory of the SoC using a cryptographic algorithm;
comparing the second authentication key with a first authentication key, wherein the first authentication key is associated with a secure boot of the SoC and obtained from an Always On (AON) memory of the SoC; and
in response to a comparison result that the first authentication key is the same as the second authentication key, waking the SoC up from the sleep mode.
2. The method of claim 1, wherein the first authentication key is written on the AON memory before the SoC enters the sleep mode.
3. The method of claim 1, further comprising:
in response to a comparison result that the first authentication key is different from the second authentication key, holding the SoC in the sleep mode.
4. The method of claim 3, wherein in response to the comparison result that the first authentication key is different from the second authentication key, the method further comprises:
generating a notification that the SoC is attacked during the sleep mode.
5. The method of claim 1, wherein the second authentication key comprises:
a signature key calculated based on signature data read from the flash memory.
6. The method of claim 1, wherein the second authentication key comprises:
an image key calculated based on a code image read from the flash memory.
7. The method of claim 1, wherein the second authentication key does not include a public key.
8. The method of claim 1, wherein the comparing the first authentication key with the second authentication key comprises:
comparing a part of the first authentication key with a corresponding part of the second authentication key.
9. The method of claim 1, wherein the comparing the first authentication key with second authentication key comprises:
comparing first 32 bits of the first authentication key with first 32 bits of the second authentication key.
10. The method of claim 1, wherein the first authentication key is read from a one-time programmable (OTP) memory of the SoC during the secure boot of the SoC.
11. The method of claim 1, wherein the wake-up condition comprises:
receiving a wake-up instruction signal from an external device;
pasting a pre-determined time duration under the sleep mode; or
receiving a wake-up triggering signal from an internal component of the SoC.
12. A system-on-chip (SoC) comprising:
a processor configured to:
determine that the SoC is under a sleep mode;
determine that a wake-up condition is met;
calculate a second authentication key based on data stored in a flash memory of the SoC using a cryptographic algorithm;

compare the second authentication key with a first authentication key, wherein the first authentication key is associated with a secure boot of the SoC and obtained from an Always On (AON) memory of the SoC; and in response to a comparison result that the first authentication key is the same as the second authentication key, wake the SoC up from the sleep mode.

13. The SoC of claim 12, wherein the first authentication key is written on the AON memory before the SoC enters the sleep mode.

14. The SoC of claim 12, wherein the processor is further configured to:

in response to a comparison result that the first authentication key is different from the second authentication key, hold the SoC in the sleep mode and generate a notification that the SoC is attacked during the sleep mode.

15. The SoC of claim 12, wherein the second authentication key comprises:

a signature key calculated based on signature data read from the flash memory.

16. The SoC of claim 12, wherein the second authentication key comprises:

an image key calculated based on a code image read from the flash memory.

17. The SoC of claim 12, wherein the comparing the first authentication key with the second authentication key comprises:

comparing a part of the first authentication key with a corresponding part of the second authentication key.

18. The SoC of claim 12, wherein the first authentication key is read from a one-time programmable (OTP) memory of the SoC during the secure boot of the SoC.

19. The SoC of claim 12, wherein the wake-up condition comprises:

receiving a wake-up instruction signal from an external device;

pasting a pre-determined time duration under the sleep mode; or receiving a wake-up triggering signal from an internal component of the SoC.

20. A non-transitory computer-readable storage medium, the computer-readable storage medium including instructions that when executed by a computer, cause the computer to:

determine that a system-on-chip (SoC) is under a sleep mode;

determine that a wake-up condition is met;

calculate a second authentication key based on data stored in a flash memory of the SoC using a cryptographic algorithm;

compare the second authentication key with a first authentication key, wherein the first authentication key is associated with a secure boot of the SoC and obtained from an Always On (AON) memory of the SoC; and in response to a comparison result that the first authentication key is the same as the second authentication key, wake the SoC up from the sleep mode.

* * * * *